US012196123B1

(12) United States Patent
Trudeau et al.

(10) Patent No.: US 12,196,123 B1
(45) Date of Patent: Jan. 14, 2025

(54) PRESS FIT TURBULENT JET IGNITION INSERT

(71) Applicant: FCA US LLC, Auburn Hills, MI (US)

(72) Inventors: Douglas A Trudeau, Lake Orion, MI (US); Kenneth L Holloway, Auburn Hills, MI (US); Steven D Ognjanovski, Washington Township, MI (US); Milorad A Kovac, Macomb Township, MI (US); Alan G Falkowski, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/184,062

(22) Filed: Mar. 15, 2023

(51) Int. Cl.

| | |
|---|---|
| ***F02B 19/10*** | (2006.01) |
| ***F02B 19/12*** | (2006.01) |
| ***F02B 19/16*** | (2006.01) |
| ***F02P 15/02*** | (2006.01) |

(52) U.S. Cl.
CPC .......... *F02B 19/12* (2013.01); *F02B 19/1004* (2013.01); *F02B 19/16* (2013.01); *F02P 15/02* (2013.01)

(58) Field of Classification Search
CPC ...... F02B 19/1004; F02B 19/12; F02B 19/16; F02B 19/165; F02P 15/02
USPC ....... 123/266, 267, 268, 270, 271, 273, 291, 123/293
See application file for complete search history.

(56) References Cited

U.S. PATENT DOCUMENTS

| | | | | |
|---|---|---|---|---|
| 3,776,212 A * | 12/1973 | Karlowitz | F02B 19/08 | 123/259 |
| 4,057,037 A * | 11/1977 | Reichel | F02B 19/1004 | 123/270 |
| 4,080,938 A * | 3/1978 | Noguchi | F02B 19/1066 | 123/274 |
| 4,132,212 A * | 1/1979 | Noguchi | F02B 19/1066 | 123/291 |
| 5,566,654 A * | 10/1996 | Masuda | F02B 19/165 | 123/271 |
| 10,612,454 B2 | 4/2020 | Bedogni et al. | | |
| 2016/0333771 A1* | 11/2016 | Willi | F02B 19/1009 | |
| 2019/0078498 A1 | 3/2019 | Bedogni et al. | | |
| 2020/0362750 A1* | 11/2020 | Rabhi | F02B 19/18 | |
| 2023/0167763 A1* | 6/2023 | Northington | F02B 19/16 | 123/271 |
| 2023/0235695 A1* | 7/2023 | Blankmeister | F02B 19/08 | 123/253 |

FOREIGN PATENT DOCUMENTS

| | | | |
|---|---|---|---|
| EP | 3453856 | A1 | 3/2019 |
| EP | 3453856 | B1 | 10/2019 |
| JP | 2019049258 | A | 3/2019 |
| JP | 6699050 | B2 | 5/2020 |

* cited by examiner

*Primary Examiner* — Erick R Solis
(74) *Attorney, Agent, or Firm* — Jeremy J. Klobucar

(57) ABSTRACT

An internal combustion engine includes an cylinder block defining at least one cylinder, a cylinder head at least partially defining a combustion chamber for each cylinder of the cylinder block, and a spark plug bore formed in the cylinder head for each cylinder, the spark plug bore connecting to the combustion chamber and configured to receive a spark plug. A turbulent jet ignition (TJI) pre-chamber insert is press-fit into the spark plug bore, and defining an internal combustion pre-chamber in fluid communication with the combustion chamber.

17 Claims, 5 Drawing Sheets

PRESS FIT TURBULENT JET IGNITION INSERT

FIELD

The present application relates generally to internal combustion engines and, more particularly, to a press-fit turbulent jet ignition insert for an internal combustion engine.

BACKGROUND

Some internal combustion engines include combustion pre-chambers. "Active" combustion pre-chambers inject air and fuel directly into the combustion pre-chamber, while "passive" combustion pre-chambers do not inject fuel directly into the combustion pre-chamber. However, some conventional pre-chambers require threading and sealing to the cylinder head, which potentially increases cost and complexity. Accordingly, while such conventional systems do work well for their intended purpose, there is a desire for improvement in the relevant art.

SUMMARY

In accordance with one example aspect of the invention, an internal combustion engine is provided. In one example implementation, the engine includes an cylinder block defining at least one cylinder, a cylinder head at least partially defining a combustion chamber for each cylinder of the cylinder block, and a spark plug bore formed in the cylinder head for each cylinder, the spark plug bore connecting to the combustion chamber and configured to receive a spark plug. A turbulent jet ignition (TJI) pre-chamber insert is press-fit into the spark plug bore, and the TJI pre-chamber insert defines an internal combustion pre-chamber in fluid communication with the combustion chamber.

In addition the foregoing, the described engine may include one or more of the following features: wherein the TJI pre-chamber insert is press-fit into the spark plug bore from a combustion chamber side of the cylinder head; wherein the spark plug bore includes a counterbore, wherein the TJI pre-chamber insert is press-fit into the counterbore; wherein the TJI pre-chamber insert is press-fit into the counterbore from a combustion chamber side of the cylinder head; and wherein the spark plug bore further includes a threaded bore portion configured to receive the spark plug such that the spark plug threads directly to the cylinder head.

In addition the foregoing, the described engine may include one or more of the following features: wherein the TJI pre-chamber insert includes a cylindrical body having an open end and an opposite rounded end, which extends at least partially into the combustion chamber; wherein the TJI pre-chamber insert rounded end includes a plurality of apertures configured to fluidly connect the combustion chamber and the internal combustion pre-chamber; wherein the plurality of apertures includes a central aperture and a plurality angled apertures arranged circumferentially about the central aperture; and wherein the TJI pre-chamber insert open end includes a chamfered edge configured to facilitate insertion of the TJI pre-chamber insert into the spark plug bore.

In addition the foregoing, the described engine may include one or more of the following features: wherein the TJI pre-chamber insert rounded end includes an annular contact surface configured to provide a contact area for press-fit tooling to press-fit the TJI pre-chamber insert into the spark plug bore; a second spark plug bore formed in the cylinder head for each cylinder, the second spark plug bore connecting to the combustion chamber and configured to receive a second spark plug; wherein the internal combustion pre-chamber is a passive combustion pre-chamber without direct fuel injection therein; and a plug and cap assembly including a plug configured to be inserted through the TJI pre-chamber insert open end and seated in the combustion pre-chamber, and a cap configured to couple to the TJI pre-chamber insert rounded end.

In accordance with another example aspect of the invention, a method of manufacturing a cylinder head for an internal combustion engine is provided. In one example implementation, the method includes providing a cylinder head at least partially defining at least one combustion chamber, machining valve seat pockets in each combustion chamber, and installing a valve seat in each machined valve seat pocket. The method further includes forming a spark plug bore in the cylinder head for each combustion chamber, the spark plug bore connecting to the combustion chamber and configured to receive a spark plug, and press-fitting a turbulent jet ignition (TJI) pre-chamber insert into the spark plug bore.

In addition the foregoing, the described method may include one or more of the following features: wherein the TJI pre-chamber insert is press-fitted into the spark plug bore from a combustion chamber side of the cylinder head; wherein the TJI pre-chamber insert is press-fitted into a counterbore of the spark plug bore; subsequent to press-fitting the TJI pre-chamber insert, machining the valve seats to final dimensions; subsequent to press-fitting the TJI pre-chamber insert, performing a high pressure wash on the TJI pre-chamber insert; and threading a spark plug directly to the cylinder head in the spark plug bore.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for a machined press-fit turbulent jet ignition (TJI) pre-chamber insert. In the example embodiments, one pre-chamber insert is press fit into a bore machined into each combustion chamber of the cylinder head. The press-fit TJI pre-chamber insert is installed prior to valve seat machining and is subsequently washed to clear machining debris. In some examples, a plug and cap assembly are provided for the pre-chamber insert for surface protection and debris abatement. The design advantageously does not require seals (e.g., O-rings), washers, internal spark plug threads, drive features for installation, or direct contact with a water jacket and coolant therein.

Figure 1:
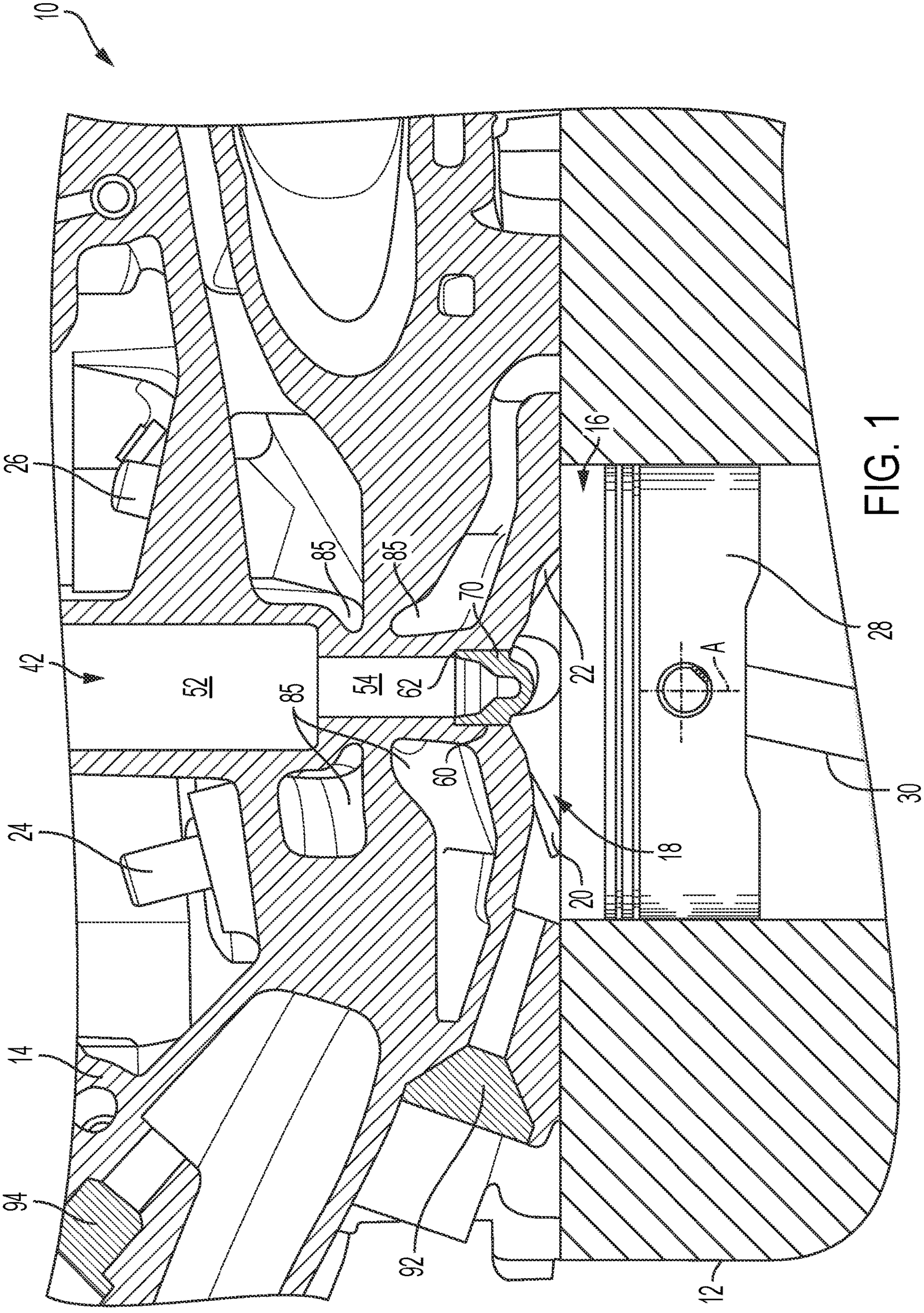
FIG. 1 is a sectional view of an example internal combustion engine having a pre-chamber insert in accordance with the principles of the present application.

With initial reference to FIG. 1, an internal combustion engine 10 in accordance with the principles of the present disclosure is illustrated. In the example embodiment, the engine 10 generally includes a cylinder block 12 and a cylinder head 14 defining a plurality of cylinders 16 (only one shown). It will be appreciated that the engine configuration described herein with reference to a single cylinder may be present on one or more of the other cylinders of the engine 10. The cylinder head 14 is mounted on the cylinder block 12 to define, for each cylinder 16, a combustion chamber 18, at least one intake port 20, and at least one exhaust port 22. Each intake port 20 is configured to receive an intake valve 24, and each exhaust port 22 is configured to receive an exhaust valve 26. Each cylinder 16 receives a piston 28, which is connected by a piston rod 30 to a respective crank of an engine shaft (not shown).

Figure 2:
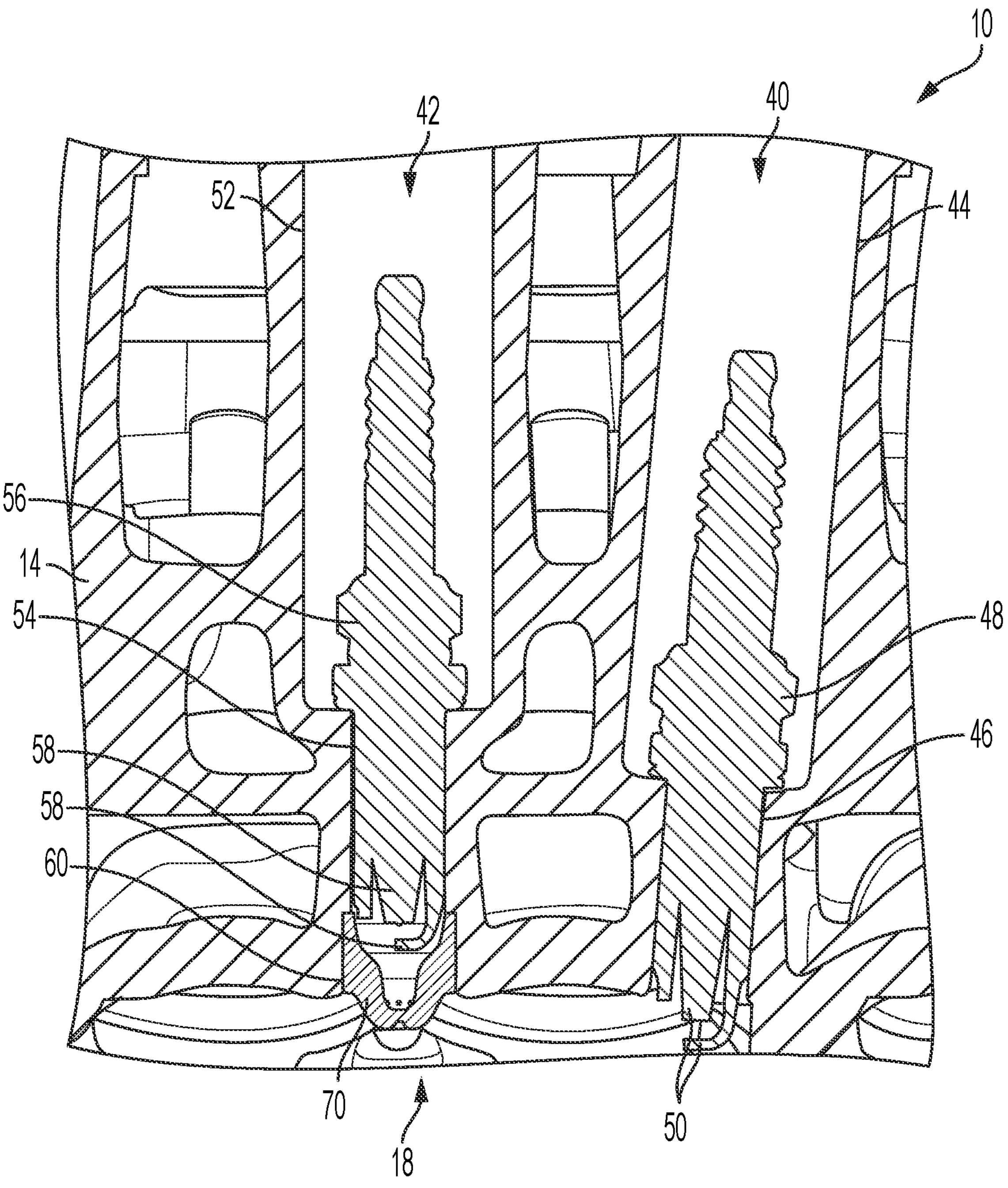
FIG. 2 is another sectional view of the internal combustion engine and pre-chamber insert shown in FIG. 1, in accordance with the principles of the present application.

As shown in FIG. 2, each cylinder 16 includes a first spark plug bore 40 and a second spark plug bore 42. The first spark plug bore 40 includes a larger diameter portion 44 and a smaller diameter portion 46. The smaller diameter portion 46 is threaded and configured to threadably receive a first spark plug 48, with electrodes 50 directly facing the combustion chamber 18. The second spark plug bore 42 similarly includes a larger diameter portion 52 and a smaller diameter portion 54. The smaller diameter portion 54 is threaded and configured to threadably receive a second spark plug 56.

In the example embodiment, the second spark plug bore 42 also includes a counterbore 60 on the combustion chamber side. The counterbore 60 defines a stop or shoulder 62. As illustrated, the counterbore 60 is configured to receive a TJI pre-chamber insert 70, which is installed from the combustion chamber side by press-fitting the pre-chamber insert 70 into the counterbore 60 until it reaches the shoulder 62 (e.g., a hard stop), which is configured to provide depth control for the pre-chamber insert 70. In some examples, the installation is controlled by force and distance monitoring with one or more suitable monitoring devices. In one example, the pre-chamber insert 70 is fabricated from a copper alloy of 99% or approximately 99% copper.

Figure 4:
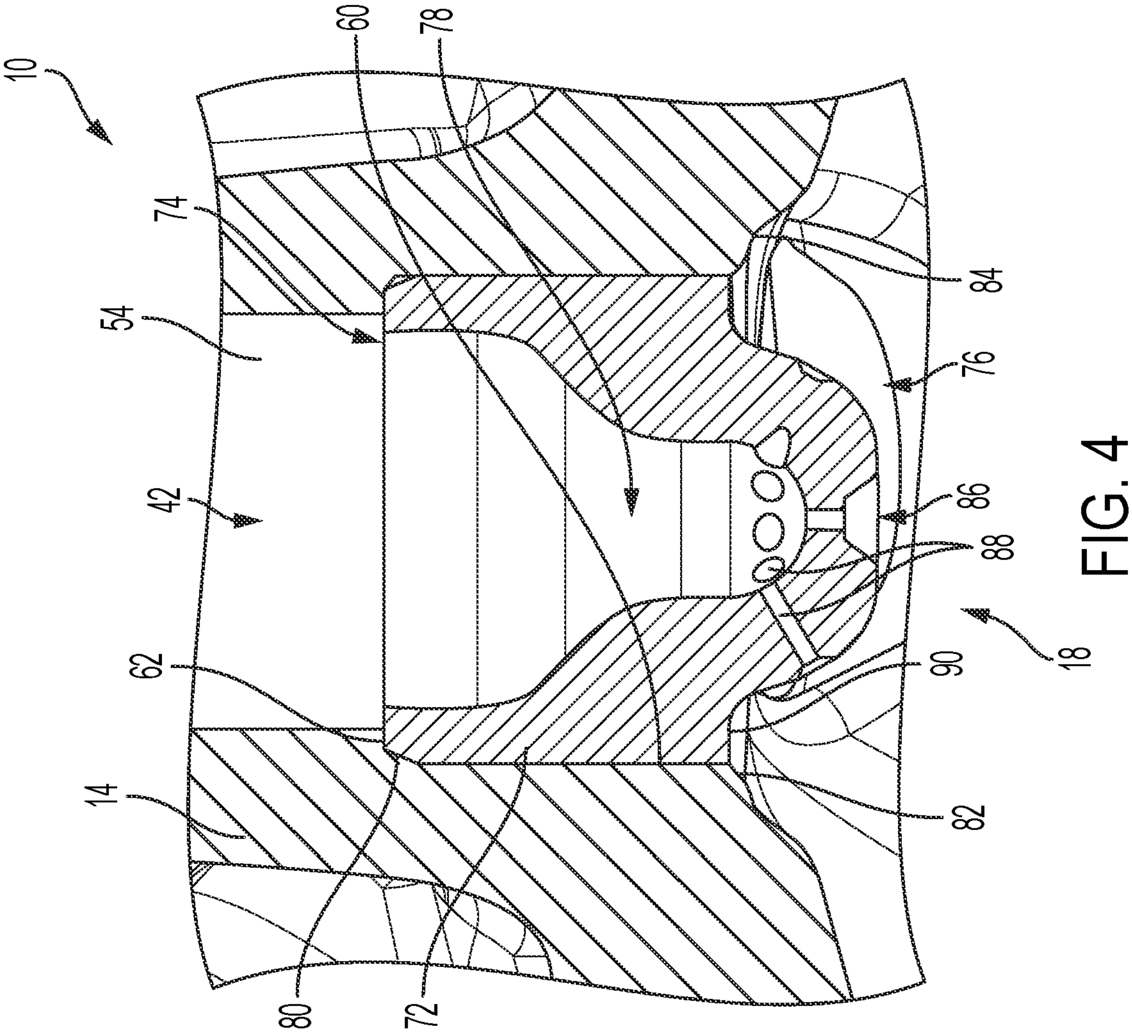
FIG. 4 is an enlarged view of the pre-chamber insert shown in FIGS. 1 and 2, in accordance with the principles of the present application.
Figure 3:
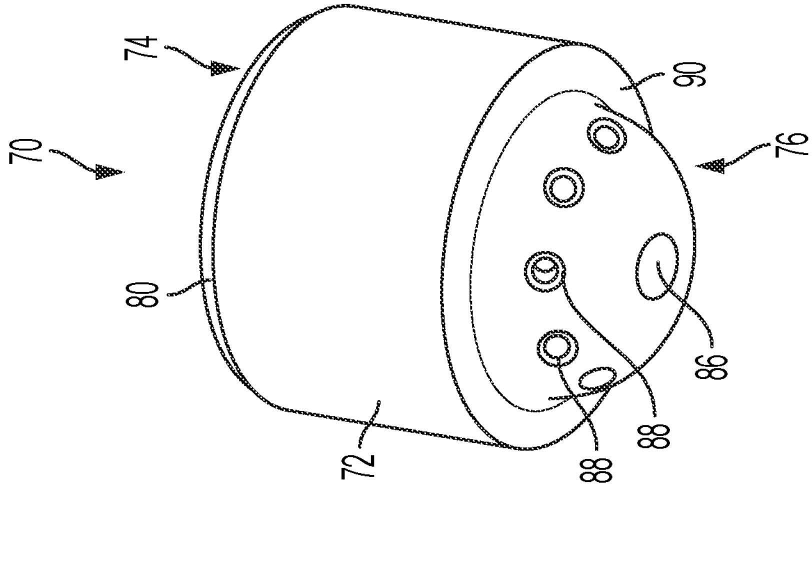
FIG. 3 is a perspective view of the example pre-chamber insert shown in FIGS. 1 and 2, in accordance with the principles of the present application.

With additional reference to FIGS. 3 and 4, the pre-chamber insert 70 is a generally thimble-like component having a cylindrical body 72 with an open end 74 and an opposite rounded tip or end 76. The body 72 defines an internal combustion pre-chamber 78 configured to receive electrodes 58 (FIG. 2) of the second spark plug 56. As shown in FIG. 4, the open end 74 includes a chamfered edge 80 configured to facilitate insertion of the pre-chamber insert 70 into the counterbore 60. Additionally, the cylinder head 14 includes a chamfered perimeter 82 about at least a portion of the edge of counterbore 60 to further facilitate insertion of the pre-chamber insert 70. In some examples, the cylinder head 14 may also include a contact land 84 configured to provide a contact area for press-fit tooling (not shown) to press-fit the pre-chamber insert 70 into the counterbore 60. Moreover, once press-fit into the counterbore 60, the pre-chamber insert 70 is proximate to (but not in fluid communication with) a water jacket 85 (FIG. 1) formed in the cylinder head 14. Coolant is directed through the water jacket 85 to provide cooling to various areas of the engine 10 including the pre-chamber insert 70 and the combustion chamber 18.

In the example embodiment, the insert rounded end 76 includes a central (axial) aperture 86 circumscribed by a plurality of circumferentially arranged, angled apertures 88. The central aperture 86 and circumferential apertures 88 are configured to provide fluid communication between the combustion pre-chamber 78 and the combustion chamber 18. In the illustrated example, the rounded end 76 includes an annular contact surface 90 oriented perpendicular to or substantially perpendicular to a longitudinal axis of the counterbore 60. The contact surface 90 is configured to provide a contact area for press-fit tooling (not shown) to press-fit the pre-chamber insert 70 into the counterbore 60. It will be appreciated that during installation, the pre-chamber insert 70 can be freely oriented to control the angular orientations of the circumferential apertures 88, unlike conventional threaded inserts.

In one example, the engine 10 is configured for direct injection of fuel via an electromagnetically controlled injector 92, and configured for indirect injection of fuel via an electromagnetically controlled injector 94 (see FIG. 1). As such, the injector 92 is configured to inject fuel directly into combustion chamber 18 (direct injection), and injector 94 is configured to inject fuel into the intake port 20 (indirect injection). A controller (not shown) is in signal communication with the injectors 92, 94 and spark plugs 48, 56 to operate the engine 10 in a direct, indirect, or combined injection mode.

As shown in FIGS. 1 and 2, in the example embodiment, the combustion pre-chamber 78 is centrally arranged with respect to the main combustion chamber 18, and has its main axis parallel to or substantially parallel to the axis 'A' of the respective cylinder 16. However, various other positions and orientations of the pre-chamber 78 with respect to the cylinder 16 are not excluded. In the illustrated example, the combustion pre-chamber 78 is a "passive" type in that it is not associated with any device for injecting fuel or air or a mixture of air and fuel directly into the combustion pre-chamber 78. During operation, stroke of the piston 28 forces the charge of the cylinder 16 through apertures 86, 88 and into the combustion pre-chamber 78. The air/fuel mixture is subsequently ignited by the second spark plug 56, and the resulting combustion is directed back through the apertures 86, 88 in various directions to subsequently ignite the remaining air/fuel mixture in combustion chamber 18 in a uniform and efficient manner.

In the example embodiment, the controller is programmed to control the injectors 92, 94 in order to produce an air/fuel mixture in the combustion chamber 18 according to a ratio essentially corresponding to a stoichiometric dose or a richer dose than stoichiometric. In this way, the engine 10 is configured to operate with an engine exhaust gas after-treatment system having a conventional trivalent catalyst for treating NOx, CO and HC, as well as a gasoline particulate filter (GPF).

Figure 7:
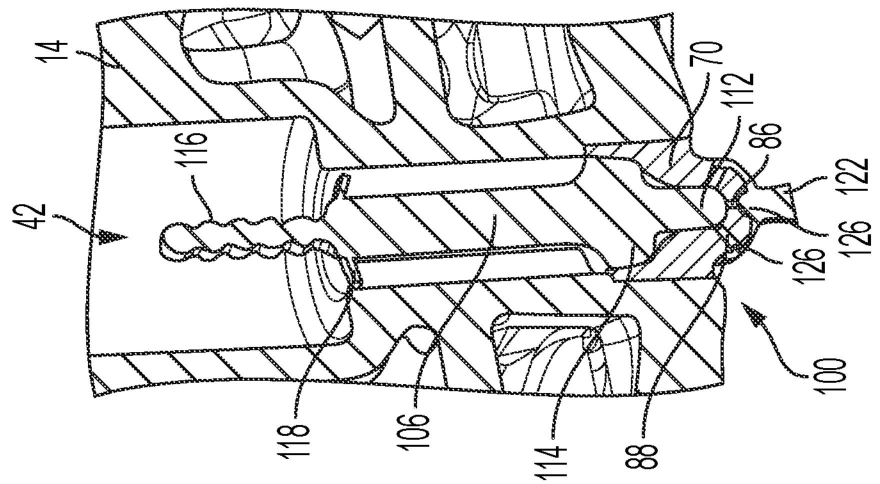
FIG. 7 is a sectional view of the plug and cap of FIGS. 5 and 6 installed on the pre-chamber insert, in accordance with the principles of the present application.
Figure 6:
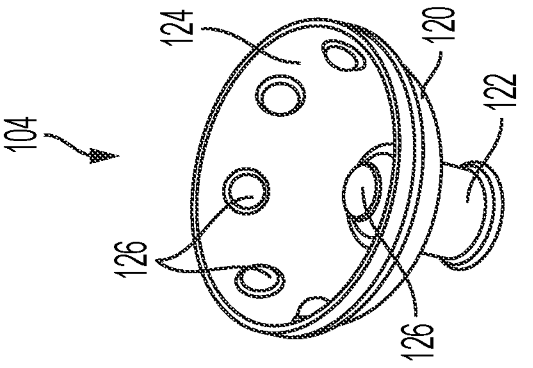
FIG. 6 is a perspective view of an example cap for the pre-chamber insert, in accordance with the principles of the present application.
Figure 5:
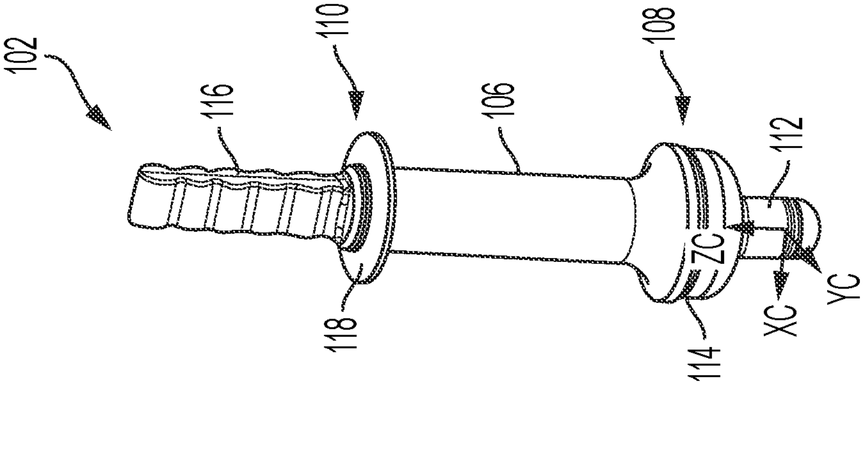
FIG. 5 is a perspective view of an example plug for the pre-chamber insert, in accordance with the principles of the present application.

With additional reference to FIGS. 5-7, a plug and cap assembly 100 for the TJI combustion pre-chamber 78 is shown and described. The plug and cap assembly 100 is configured to protect the combustion pre-chamber 78 from damage and debris during manufacturing, assembly, and machining of the cylinder head 14. The plug and cap assembly 100 is subsequently removed for final assembly of the engine 10.

In the example embodiment, the assembly 100 generally includes a plug 102 and a cap 104. As shown in FIG. 5, the plug 102 includes a generally elongated stem or body 106 having a first end 108 and an opposite second end 110. The first end 108 is configured to be inserted into the second spark plug bore 42 and into the combustion pre-chamber 78. The first end 108 includes an axial projection 112 and an enlarged outer diameter portion 114. The axial projection 112 is configured to seal or seat against the apertures 86, 88 from an interior of the pre-chamber 70, and the enlarged OD portion 114 is configured to seal against an interior wall of the pre-chamber insert 70 to seal or enclose the insert open end 74. In one example, the first end 108 is removably press-fit into the combustion pre-chamber 78.

In the example embodiment, the plug second end 110 includes a gripping tab 116 and a radial flange 118. The gripping tab 116 extends axially outward from body 106 and includes a gripping surface configured to facilitate insertion and removal of the plug 102 into and out of the second spark plug bore 42. The radial flange 118 is positioned adjacent a proximal end of the gripping tab 116 and extends radially outward from the body 106. The radial flange 118 is configured to seat or seal against an upper portion of the threaded inner wall of smaller diameter portion 54 of bore 42. In this way, radial flange 118 is configured to prevent debris from entering the smaller diameter portion 54 from the side opposite the combustion chamber 18.

As shown in FIG. 6, in the example embodiment, the cap 104 generally includes a bowl-shaped or hemispherical body 120 with a gripping post or tab 122 extending outwardly therefrom. The hemispherical body 120 includes a concave inner surface 124 having a plurality of circumferentially spaced, inwardly extending projections 126 (e.g., rounded, conical) configured to be received and seated within the apertures 86, 88 from an exterior side of pre-chamber insert 70. In this way, the cap 104 is removably coupled to the pre-chamber insert 70 to prevent debris from entering the apertures 86, 88 and thus combustion pre-chamber 78 during manufacture and assembly of the cylinder head 14. The gripping tab 122 is configured to be grasped to facilitate coupling to or removal of the cap 104 from the pre-chamber insert 70. FIG. 7 illustrates the plug and cap assembly 100 coupled to the pre-chamber insert 70.

Figure 8:
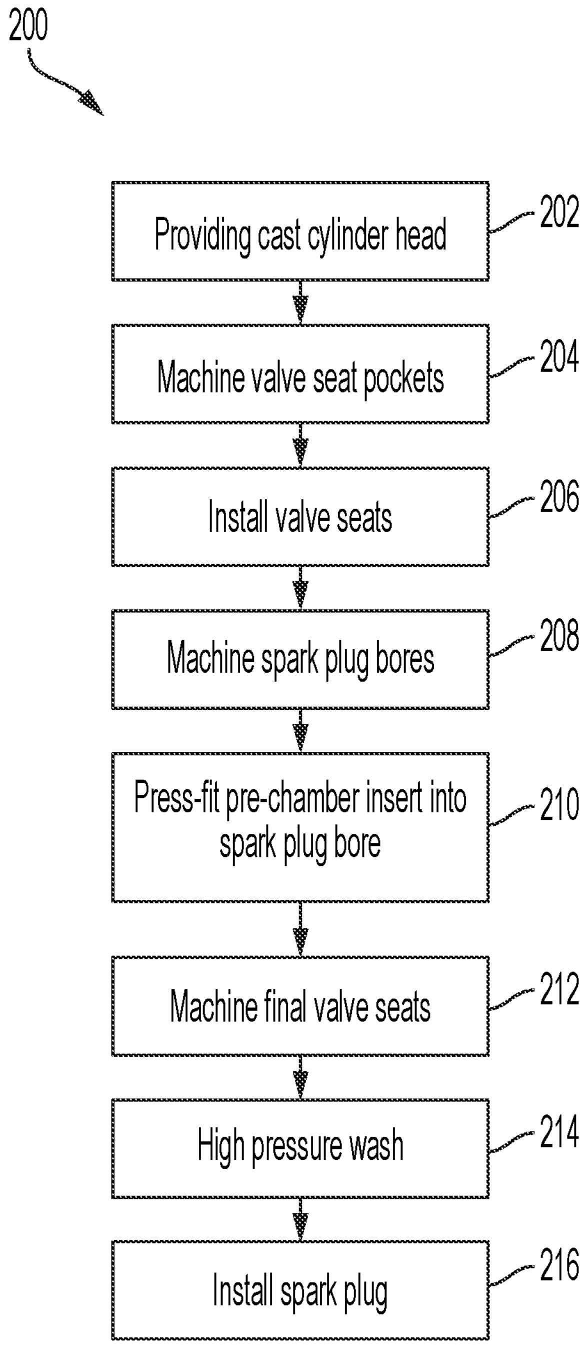
FIG. 8 is an example method of manufacturing the cylinder head shown in FIGS. 1 and 2, in accordance with the principles of the present application.

With reference now to FIG. 8, a method 200 of manufacturing cylinder head 14 is shown and described. The method 200 begins at step 202 by providing an unfinished cylinder head 14. This may be, for example, an unfinished cylinder head produced by a casting process. At step 204, valve seat pockets 140 (FIG. 2) are machined into the cylinder head 14. At step 206, valve seats 142 are installed in the machined valve seat pockets 140. At step 208, the first and second spark plug bores 40, 42 are machined into the cylinder head 14. At step 210, the pre-chamber insert 70 is press-fit (e.g., in a permanent, non-removable manner) into counterbore 60 until it reaches the shoulder 62. At step 212, the valve seats 142 are machined to final dimensions. In some examples, the valve seats must be machined to final dimensions after press-fitting the pre-chamber insert 70 to prevent any potential valve seat distortion. At step 214, a high pressure washing process is performed on the second spark plug bore 42 and pre-chamber insert 70, for example, to eliminate and flush chips and burrs from the machining processes. At step 216, the second spark plug 56 is threaded directly to the cylinder head 14 in the smaller diameter portion 54.

Although described as press-fitting the pre-chamber insert 70 into the cylinder head 14 from the combustion chamber side, it will be appreciated that counterbore 60 may be reversed and the pre-chamber insert 70 may be loaded and press-fit from the top of the second spark plug bore 42. In this case, the smaller diameter portion 54 may be enlarged and receive a larger diameter spark plug. Additional or alternative methods of securing the pre-chamber insert 70 within the second spark plug bore 42 include, but are not limited to, utilizing a tapered counterbore, staking the edge of counterbore 60 over the pre-chamber insert 70 after installation, providing an undercut (e.g., larger diameter) in an upper portion of counterbore 60 and expanding an upper diameter portion of the insert 70 (from the spark plug side) after insertion, utilizing an adhesive on the insert 70, peening proud features of the insert second end 76 over onto the edge of the cylinder head spark plug bore, providing raised ribs on the outer diameter of the insert 70 that snap into matching grooves on the counterbore 60, and/or providing a metallic sleeve around the insert 70 and subsequently welding/brazing the sleeve to the cylinder head 14 once inserted into counterbore 60.

Described herein are systems and methods for an internal combustion engine having a combustion pre-chamber. A turbulent jet ignition pre-chamber insert is press-fitted into a counterbore formed into a portion of the cylinder head that forms the cylinder combustion chamber. The pre-chamber insert defines a combustion pre-chamber configured to receive spark plug electrodes.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An internal combustion engine, comprising:

a cylinder block defining at least one cylinder;

a cylinder head at least partially defining a combustion chamber for each cylinder of the cylinder block;

a spark plug bore formed in the cylinder head for each cylinder, the spark plug bore connecting to the combustion chamber and configured to receive a spark plug; and a turbulent jet ignition (TJI) pre-chamber insert press-fit into the spark plug bore, wherein the TJI pre-chamber insert defines an internal combustion pre-chamber in fluid communication with the combustion chamber;

wherein the TJI pre-chamber insert includes:

a cylindrical body having an open end and an opposite rounded end, which extends at least partially into the combustion chamber;

a plug and cap assembly including i) a plug configured to be inserted through the TJI pre-chamber insert open end and seated in the combustion pre-chamber, and ii) a cap configured to couple to the TJI pre-chamber insert rounded end.

2. The engine of claim 1, wherein the TJI pre-chamber insert is press-fit into the spark plug bore from a combustion chamber side of the cylinder head.

3. The engine of claim 1, wherein the spark plug bore includes a counterbore, wherein the TJI pre-chamber insert is press-fit into the counterbore.

4. The engine of claim 3, wherein the TJI pre-chamber insert is press-fit into the counterbore from a combustion chamber side of the cylinder head.

5. The engine of claim 3, wherein the spark plug bore further includes a threaded bore portion configured to receive the spark plug such that the spark plug threads directly to the cylinder head.

6. The engine of claim 1, wherein the TJI pre-chamber insert rounded end includes a plurality of apertures configured to fluidly connect the combustion chamber and the internal combustion pre-chamber.

7. The engine of claim 6, wherein the plurality of apertures includes:

a central aperture; and a plurality of angled apertures arranged circumferentially about the central aperture.

8. The engine of claim 1, wherein the TJI pre-chamber insert open end includes a chamfered edge configured to facilitate insertion of the TJI pre-chamber insert into the spark plug bore.

9. The engine of claim 1, wherein the TJI pre-chamber insert rounded end includes an annular contact surface configured to provide a contact area for press-fit tooling to press-fit the TJI pre-chamber insert into the spark plug bore.

10. The engine of claim 1, further comprising a second spark plug bore formed in the cylinder head for each cylinder, the second spark plug bore connecting to the combustion chamber and configured to receive a second spark plug.

11. The engine of claim 1, wherein the internal combustion pre-chamber is a passive combustion pre-chamber without direct fuel injection therein.

12. A method of manufacturing a cylinder head for an internal combustion engine, the method comprising:

providing a cylinder head at least partially defining at least one combustion chamber;

machining valve seat pockets in each combustion chamber;

installing a valve seat in each machined valve seat pocket;

forming a spark plug bore in the cylinder head for each combustion chamber, the spark plug bore connecting to the combustion chamber and configured to receive a spark plug; and press-fitting a turbulent jet ignition (TJI) pre-chamber insert into the spark plug bore, wherein the TJI pre-chamber insert includes:

a cylindrical body having an open end and an opposite rounded end, which extends at least partially into the combustion chamber;

a plug and cap assembly including i) a plug configured to be inserted through the TJI pre-chamber insert open end and seated in the combustion pre-chamber, and ii) a cap configured to couple to the TJI pre-chamber insert rounded end.

13. The method of claim 12, wherein the TJI pre-chamber insert is press-fitted into the spark plug bore from a combustion chamber side of the cylinder head.

14. The method of claim 12, wherein the TJI pre-chamber insert is press-fitted into a counterbore of the spark plug bore.

15. The method of claim 12, further comprising:

subsequent to press-fitting the TJI pre-chamber insert, machining the valve seats to final dimensions.

16. The method of claim 12, further comprising:

subsequent to press-fitting the TJI pre-chamber insert, performing a high pressure wash on the TJI pre-chamber insert.

17. The method of claim 12, further comprising threading the spark plug directly to the cylinder head in the spark plug bore.

* * * * *